US008664328B2

(12) United States Patent
Cauvin et al.

(10) Patent No.: US 8,664,328 B2

(45) **Date of Patent: *Mar. 4, 2014**

(54) EMULSIONS OF BORON CROSSLINKED ORGANOPOLYSILOXANES

(75) Inventors: Severine Cauvin, Braine-le-Comte (BE); Glenn Gordon, Midland, MI (US); Bethany Johnson, Midland, MI (US); Donald Liles, Midland, MI (US)

(73) Assignee: Dow Corning Corporation, Midland, MI (US)

( * ) Notice: Subject to any disclaimer, the term of this patent is extended or adjusted under 35 U.S.C. 154(b) by 320 days.

This patent is subject to a terminal disclaimer.

(21) Appl. No.: 12/937,295

(22) PCT Filed: Apr. 13, 2009

(86) PCT No.: PCT/US2009/040350

§ 371 (c)(1),
(2), (4) Date: Oct. 11, 2010

(87) PCT Pub. No.: WO2009/129175

PCT Pub. Date: Oct. 22, 2009

(65) Prior Publication Data

US 2011/0033627 A1 Feb. 10, 2011

Related U.S. Application Data

(60) Provisional application No. 61/044,594, filed on Apr. 14, 2008.

(51) Int. Cl.

| | |
|---|---|
| ***C08L 83/00*** | (2006.01) |
| ***C08G 77/06*** | (2006.01) |
| ***C08G 79/08*** | (2006.01) |
| ***C08G 77/00*** | (2006.01) |

(52) U.S. Cl.
USPC .................. 524/588; 524/837; 528/4; 528/8; 528/10

(58) Field of Classification Search
None
See application file for complete search history.

(56) References Cited

U.S. PATENT DOCUMENTS

| | | | |
|---|---|---|---|
| 2,431,898 A | 12/1947 | Witken | |
| 2,798,053 A | 7/1957 | Brown | |
| 3,194,680 A * | 7/1965 | Damm et al. | 427/387 |
| 3,958,581 A | 5/1976 | Abegg | |
| 3,962,418 A | 6/1976 | Birkofer | |
| 4,006,880 A | 2/1977 | Snowdon | |
| 4,009,256 A | 2/1977 | Nowak, Jr. et al. | |
| 4,330,488 A | 5/1982 | Bouillon et al. | |
| 4,387,089 A | 6/1983 | De Polo | |
| 4,489,057 A | 12/1984 | Welters et al. | |
| 4,562,067 A | 12/1985 | Hopp et al. | |
| 4,585,597 A | 4/1986 | Lang et al. | |

(Continued)

FOREIGN PATENT DOCUMENTS

| | | |
|---|---|---|
| AU | 637359 | 10/1990 |
| AU | 496075 | 5/1996 |

(Continued)

*Primary Examiner* — Timothy Meeks
*Assistant Examiner* — Ina Agaj
(74) *Attorney, Agent, or Firm* — Alan Zombeck

(57) ABSTRACT

A process is disclosed for preparing an emulsion composition by forming a mixture of a silanol functional organopolysiloxane, a boron compound, an emulsifier, and then admixing water to the mixture to form an emulsion. The resulting emulsions are useful for providing a coating of a high viscosity or dilatant silicone.

9 Claims, 1 Drawing Sheet

(56) References Cited

U.S. PATENT DOCUMENTS

| | | | | | |
|---|---|---|---|---|---|
| 4,620,878 | A | * | 11/1986 | Gee | 516/55 |
| 4,690,967 | A | * | 9/1987 | LaGarde et al. | 524/266 |
| 4,704,272 | A | | 11/1987 | Oh et al. | |
| 4,741,855 | A | | 5/1988 | Grote et al. | |
| 4,775,526 | A | | 10/1988 | Lang et al. | |
| 4,788,006 | A | | 11/1988 | Bolich, Jr. et al. | |
| 4,863,985 | A | | 9/1989 | Pouchol et al. | |
| 5,039,711 | A | | 8/1991 | Blount | |
| 5,340,633 | A | | 8/1994 | van der Loo et al. | |
| 5,356,980 | A | | 10/1994 | Feder et al. | |
| 5,569,528 | A | | 10/1996 | Van der Loo et al. | |
| 5,643,557 | A | | 7/1997 | Eteve et al. | |
| 5,690,915 | A | | 11/1997 | Eteve et al. | |
| 5,690,917 | A | | 11/1997 | Eteve et al. | |
| 5,695,747 | A | | 12/1997 | Forestier et al. | |
| 5,766,725 | A | | 6/1998 | Hogenboom et al. | |
| 5,788,955 | A | | 8/1998 | Eteve et al. | |
| 5,795,565 | A | | 8/1998 | Eteve et al. | |
| 5,833,965 | A | | 11/1998 | Sun et al. | |
| 5,891,954 | A | | 4/1999 | Gee et al. | |
| 5,919,441 | A | | 7/1999 | Mendolia et al. | |
| 5,973,061 | A | | 10/1999 | Feder et al. | |
| 5,981,680 | A | | 11/1999 | Petroff et al. | |
| 6,051,216 | A | | 4/2000 | Barr et al. | |
| 6,183,834 | B1 | | 2/2001 | van der Loo | |
| 6,238,768 | B1 | | 5/2001 | Van de Goot | |
| 6,709,504 | B2 | | 3/2004 | Iwato et al. | |
| 6,723,267 | B2 | | 4/2004 | Simmelink et al. | |
| 6,893,704 | B1 | | 5/2005 | van der Loo | |
| 6,916,533 | B2 | | 7/2005 | Simmelink et al. | |
| 6,931,662 | B2 | | 8/2005 | Lindemulder | |
| 7,078,026 | B2 | | 7/2006 | Ferrari et al. | |
| 7,114,186 | B2 | | 10/2006 | Steeghs et al. | |
| 7,288,314 | B2 | | 10/2007 | Jacobs et al. | |
| 7,311,963 | B2 | | 12/2007 | Mokveld et al. | |
| 7,608,314 | B2 | | 10/2009 | Plant | |
| 7,794,827 | B2 | | 9/2010 | Palmer et al. | |
| 8,334,524 | B2 | | 12/2012 | DeMeo et al. | |
| 2003/0037361 | A1 | | 2/2003 | Steeghs et al. | |
| 2003/0072730 | A1 | | 4/2003 | Tournilhac | |
| 2003/0114787 | A1 | | 6/2003 | Gura | |
| 2003/0170188 | A1 | | 9/2003 | Ferrari et al. | |
| 2003/0235553 | A1 | | 12/2003 | Lu et al. | |
| 2004/0161605 | A1 | | 8/2004 | Simmelink et al. | |
| 2004/0180032 | A1 | | 9/2004 | Manelski et al. | |
| 2005/0097647 | A1 | | 5/2005 | Steeghs et al. | |
| 2006/0051564 | A1 | | 3/2006 | Jacobs et al. | |
| 2006/0258820 | A1 | | 11/2006 | Schneider | |
| 2007/0042124 | A1 | * | 2/2007 | Matsumura et al. | 427/440 |
| 2007/0164474 | A1 | | 7/2007 | Jacobs et al. | |
| 2008/0254076 | A1 | | 10/2008 | Ferrari et al. | |
| 2011/0033398 | A1 | | 2/2011 | Cauvin et al. | |
| 2011/0033627 | A1 | | 2/2011 | Cauvin et al. | |
| 2011/0039087 | A1 | | 2/2011 | Cauvin et al. | |

FOREIGN PATENT DOCUMENTS

| | | | |
|---|---|---|---|
| EP | 0488465 | | 11/1991 |
| EP | 0340877 | | 8/1992 |
| EP | 0533289 | | 3/1993 |
| EP | 317447 | B1 | 9/1994 |
| EP | 0487404 | | 10/1995 |
| EP | 0446157 | | 6/1996 |
| EP | 705162 | | 7/1998 |
| EP | 1124885 | | 5/2000 |
| EP | 744935 | | 11/2000 |
| EP | 910689 | | 12/2000 |
| EP | 0768507 | | 1/2001 |
| EP | 1219915 | | 7/2002 |
| EP | 833742 | | 9/2002 |
| EP | 1256641 | | 11/2002 |
| EP | 907504 | | 12/2002 |
| EP | 1137828 | | 12/2002 |
| EP | 1336672 | | 8/2003 |
| EP | 1336673 | | 8/2003 |
| EP | 1746187 | | 7/2005 |
| EP | 1627719 | | 2/2006 |
| EP | 1219916 | | 8/2006 |
| EP | 1575758 | | 9/2006 |
| EP | 1724097 | | 11/2006 |
| EP | 1474550 | | 9/2007 |
| EP | 1873281 | | 1/2008 |
| GB | 890007 | A | 2/1962 |
| GB | 1387040 | A | 3/1975 |
| JP | 4257439 | A | 9/1992 |
| JP | 4257440 | A | 9/1992 |
| JP | 47426422 | | 9/1992 |
| JP | 06220242 | | 8/1994 |
| JP | 2003147201 | | 5/2003 |
| WO | WO9320271 | | 10/1993 |
| WO | WO9500318 | | 1/1995 |
| WO | WO9522311 | | 8/1995 |
| WO | WO9700766 | | 1/1997 |
| WO | WO9749546 | | 12/1997 |
| WO | WO9802607 | | 1/1998 |
| WO | WO00/29468 | | 5/2000 |
| WO | WO0024811 | | 5/2000 |
| WO | WO0024952 | | 5/2000 |
| WO | WO0069293 | | 11/2000 |
| WO | WO0159397 | | 8/2001 |
| WO | WO01/67028 | | 9/2001 |
| WO | WO0167027 | | 9/2001 |
| WO | WO03022085 | | 3/2003 |
| WO | WO03069032 | | 8/2003 |
| WO | WO03105789 | | 12/2003 |
| WO | WO03105801 | | 12/2003 |
| WO | WO03106614 | | 12/2003 |
| WO | WO2004000247 | | 12/2003 |
| WO | WO2004039565 | | 5/2004 |
| WO | WO2004054523 | | 7/2004 |
| WO | WO2004054524 | | 7/2004 |
| WO | WO2004060101 | | 7/2004 |
| WO | WO2004060271 | | 7/2004 |
| WO | WO2004060276 | | 7/2004 |
| WO | WO2005/065910 | | 7/2005 |
| WO | WO2005/066400 | | 7/2005 |
| WO | WO2005/066401 | | 7/2005 |
| WO | WO2005/066577 | | 7/2005 |
| WO | WO2006/002977 | | 1/2006 |
| WO | WO2006/003015 | | 1/2006 |
| WO | WO2006/010521 | | 2/2006 |
| WO | WO2006/063752 | | 6/2006 |
| WO | WO2007/003334 | | 1/2007 |
| WO | WO2007/009540 | | 1/2007 |
| WO | WO2007009563 | | 1/2007 |
| WO | WO2007080113 | | 7/2007 |
| WO | WO2007102020 | | 9/2007 |
| WO | WO2007107359 | | 9/2007 |
| WO | WO2007122000 | | 11/2007 |
| WO | WO2007122009 | | 11/2007 |
| WO | WO2007122010 | | 11/2007 |
| WO | WO2007122011 | | 11/2007 |

* cited by examiner

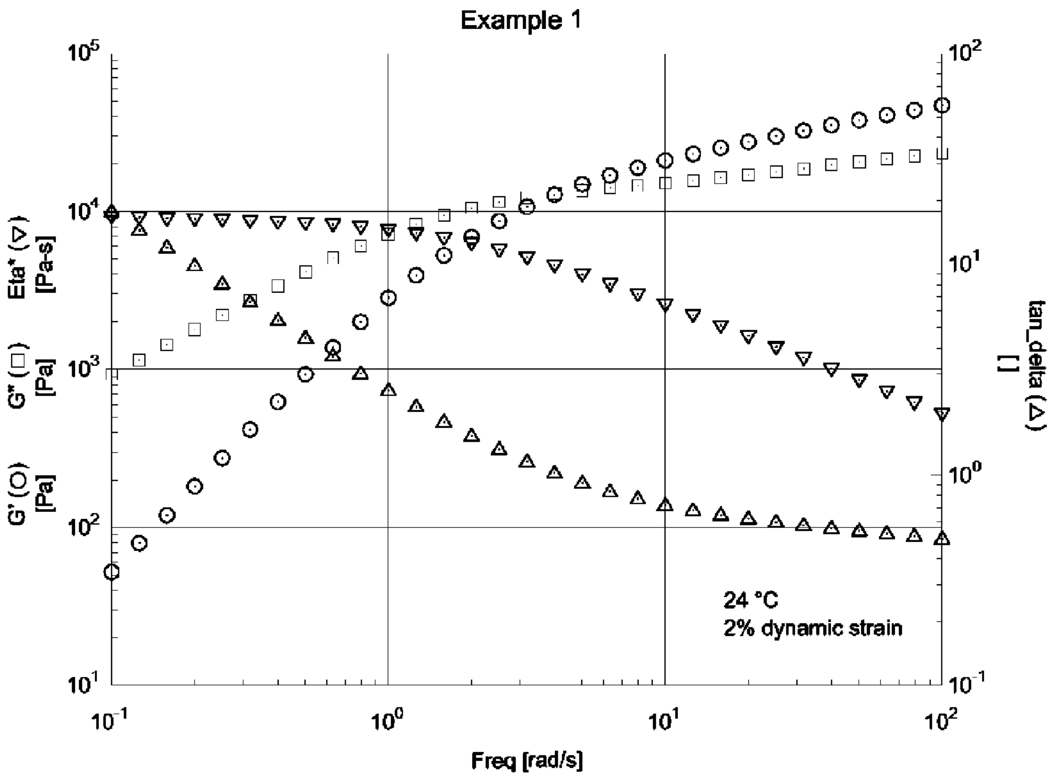
Example 1
$10^5$
$10^4$
$10^3$
$10^2$
$10^1$
Eta* (▽) [Pa-s]
G" (□) [Pa]
G' (○) [Pa]
$10^2$
$10^1$
$10^0$
$10^{-1}$
tan_delta (Δ) []
$10^{-1}$
$10^0$
$10^1$
$10^2$
Freq [rad/s]
24 °C
2% dynamic strain

EMULSIONS OF BORON CROSSLINKED ORGANOPOLYSILOXANES

CROSS REFERENCE TO RELATED APPLICATIONS

This application is a U.S. national stage filing under 35 U.S.C. §371 of PCT Application No. PCT/US09/40350 filed on Apr. 13, 2009, which claims the benefit of U.S. Provisional Patent Application No. 61/044594 filed Apr. 14, 2008 under 35 U.S.C. §119 (e). PCT Application No. PCT/US09/40350 and U.S. Provisional Patent Application No. 61/044594 are hereby incorporated by reference.

TECHNICAL FIELD

This disclosure relates to a process for preparing an emulsion composition by forming a mixture of a silanol functional organopolysiloxane, a boron compound, an emulsifier, and then admixing water to the mixture to form an emulsion. The resulting emulsions are useful for providing a coating of a high viscosity or dilatant silicone.

BACKGROUND

There have been numerous attempts to provide emulsions of high molecular weight silicones as an alternative to handling such materials in bulk. Generally, there are two types of processes to prepare emulsion of high molecular weight silicones, either via emulsion polymerization of siloxane monomers or mechanical emulsification of pre-formed high molecular weight silicones. Very often, there is a need to incorporate other components in a silicone composition to affect the properties of the silicone. For example, other additive components such as fillers, catalysts, or crosslinkers may be of interest in a silicone composition to alter subsequent physical properties of the silicone. However, incorporation of many of these components in a silicone emulsion composition may be problematic depending on the selection of the additive component and the emulsion process (that is mechanical vs emulsion polymerization process). For example, if the desired silicone additive component interacts with water during the emulsification process it may be difficult or impossible to incorporate its addition into a silicone emulsion.

There are abundant examples in the silicone emulsion art incorporating a variety of crosslinking components with organopolysiloxanes to provide high molecular weight or elastomeric silicone compositions. However, there are few examples for the addition of boron compounds as crosslinking additives in a silicone emulsion.

Many boron crosslinked organopolysiloxanes, or borosiloxanes, are of particular interest because of their inherent dilatant properties. For example, dilatant boron crosslinked silicones are used in active protection systems (APS) wherein a fabric is coated with a boron crosslinked silicone. However, such processes require the boron crosslinked silicone be first dispersed or dissolved in a solvent. Water based emulsions of boron crosslinked silicones would be easier to use and environmentally more desirable in such processes. However, there are few examples of emulsions of boron crosslinked silicones or borosiloxanes. Presumably, the interaction of a boron crosslinker with water has limited this crosslinking chemistry in a water based composition. Thus, a need exists to provide emulsions of boron crosslinked silicones to avoid undesirable solvent based processes.

U.S. Pat. No. 4,863,985 teaches aqueous silicone emulsions cross-linkable into an elastomeric state. In particular, U.S. Pat. No. 4,863,985 discloses thixotropic silicone emulsions cross-linkable into elastomeric state upon removal of water therefrom, e.g., to fabricate elastomer seals for the construction industry, have a pH of from 4 to 8 and a solids content of at least 50%, and contain: (A) 100 parts of an oil-in-water emulsion of an $\alpha,\omega$-(dihydroxy) polydiorganosiloxane, and a stabilizing amount of at least one anionic or nonionic surface-active agent, or mixture thereof; (B) 1 to 15 parts of a siliceous reinforcing filler in powder form; (C) 0 to 250 parts of an inorganic filler other than the siliceous filler (B); (D) 0.01 to 2 parts of a catalytic tin compound; and (E) 0.1 to 5 parts of boric oxide, a boric acid or a borate. While U.S. Pat. No. 4,863,985 teaches emulsions of silicones that provide elastomeric silicones, the addition of tin and fillers are necessary in these compositions. Furthermore, U.S. Pat. No. 4,863,985 teaches the addition of a boron compound to a pre-formed oil-in-water emulsion of $\alpha,\omega$-(dihydroxy) polydiorganosiloxane.

The present inventors have discovered a process for preparing emulsions of boron crosslinked organopolysiloxanes. In contrast to prior art teachings, the present inventors have unexpectedly discovered that boron compounds may be incorporated with an organopolysiloxane prior to forming an emulsion. The process provides emulsions of boron crosslinked organopolysiloxanes that yield subsequent silicone polymers of varying physical properties. In particular, the present process provides emulsions of boron crosslinked organopolysiloxanes that yield coatings that vary from a highly viscous silicone liquid to an elastomeric silicone having dilatant properties.

SUMMARY

This disclosure provides a process for preparing an emulsion composition comprising:

I) forming a mixture of;
   A) a silanol functional organopolysiloxane,
   B) a boron compound, and
   C) an emulsifier,
II) admixing water to the mixture from step I) to form an emulsion,
III) optionally, further shear mixing the emulsion.

The emulsions from the present process are useful in a variety of applications. For example, the present process provides emulsions of high viscosity silicones for hair care applications. The present process further provides emulsions of dilatant silicones which are useful as fabric coatings for Active Protection Systems.

BRIEF DESCRIPTION OF THE DRAWINGS

FIG. 1 is a graph representing results disclosed in Example 1.

DETAILED DESCRIPTION

The first step of the process of the present disclosure involves forming a mixture of;

A) a silanol functional organopolysiloxane,
B) a boron compound, and
C) an emulsifier, each of which are described in more detail as follows.

A) The Silanol Functional Organopolysiloxane

Organopolysiloxanes are polymers containing siloxane units independently selected from $(R_3SiO_{0.5})$, $(R_2SiO)$, $(RSiO_{1.5})$, or $(SiO_2)$ siloxy units, where R may independently be an organic group, OH (silanol), or H (SiH functional). These siloxy units are commonly referred to as M, D, T, and Q units respectively. These siloxy units can be combined in various manners to form cyclic, linear, or branched structures. The chemical and physical properties of the resulting polymeric structures will vary depending on the type and number of each siloxy units present in the organopolysiloxane. For example organopolysiloxanes can be volatile or low viscosity fluids, high viscosity fluids/gums, elastomers or rubbers, and resins.

The organopolysiloxane useful as component A) in the present invention may have any combination of $(R_3SiO_{0.5})$, $(R_2SiO)$, $(RSiO_{1.5})$, or $(SiO_2)$ siloxy units, providing the organopolysiloxane contains at least one silanol group (SiOH). Thus, the organopolysiloxane may have varying molecular weights and be a liquid, a gum, an elastomer, a resin, or any combination thereof. For example, the organopolysiloxane may be a mixture of a higher molecular weight organopolysiloxane (such as an elastomer or resin) in a lower molecular weight liquid organopolysiloxane, providing there is at least one silanol group in the organopolysiloxane composition of component A.

The amount of silanol groups present in the organopolysiloxane may vary. The amount of silanol groups in the organopolysiloxane may be designated as weight percent of SiOH. The weight percent of silanol groups that are typical in the organopolysiloxanes useful as component A) vary from 0.01 to 20 weight percent, alternatively from 0.05 to 10 weight percent, alternatively from 0.05 to 4 weight percent.

In one embodiment, the organopolysiloxane is a predominately linear polydimethylsiloxane having terminal silanol groups. The predominately linear polydimethylsiloxane having terminal silanol groups may have the formula;

$$HO(Me)_2SiO[(Me)_2SiO]_x(Me)_2SiOH$$

where x is >0, alternatively, x is 1-4000, alternatively 10-1000.

In yet another embodiment, the silanol functional organopolysiloxane may be mixed with other silane or polysiloxane components before or during mixing with components B) and C). The other silane or siloxane components include organofunctional silanes or organofunctional polysiloxanes that can react with the silanol functional organopolysiloxane. Suitable organofunctional silanes include amino functional silanes such as;

aminopropyl trimethoxysilane,
ethylenediaminepropyl trimethoxysilane, or
ethylenediamineisobutyl trimethoxysilane.

Suitable organofunctional polysiloxanes include amino functional organopolysiloxanes such as those having a formula $$R^2R_2SiO(R_2\ SiO)_a(R^1RSiO)_bSiR_2R^2$$

or $$R^2R_2SiO(R_2SiO)_a(R^1SiO_{3/2})_bSiR_2R^2$$

wherein R is a monovalent organic group, $R^1$ is an aminoalkyl group having its formula selected from the group consisting of $—R^3\ NH_2$ and $—R^3\ NHR^4\ NH_2$ wherein $R^3$ is a divalent hydrocarbon group having at least 3 carbon atoms and $R^4$ is a divalent hydrocarbon group having at least 2 carbon atoms, $R^2$ is R, $R^1$, or OH, a has a value of 0 to 2000, and b has a value of from greater than zero to 200. The monovalent R groups are exemplified by alkyl groups such as the methyl, ethyl, propyl, butyl, amyl, and hexyl; alkenyl groups such as the vinyl, allyl, and hexenyl; cycloalkyl groups such as the cyclobutyl and cyclohexyl; aryl groups such as the phenyl and naphthyl; aralkyl groups such as the benzyl and 2-phenylethyl; alkaryl groups such as the tolyl, and xylyl; halohydrocarbon groups such as 3-chloropropyl, 4-bromobutyl, 3,3,3-trifluoropropyl, chlorocyclohexyl, bromophenyl, and chlorophenyl. Typically R is a monovalent hydrocarbon group having from 1 to 6 carbon atoms. Especially preferred R groups are methyl, phenyl, and vinyl. The group $R^3$ is typically an alkylene group having from 3 to 20 carbon atoms. Typically $R^3$ is selected from propylene, $—CH_2\ CHCH_3—$, butylene, $—CH_2\ CH(CH_3)CH_2—$, pentamethylene, hexamethylene, 3-ethyl-hexamethylene, octamethylene, and decamethylene. The group $R^4$ is typically an alkylene group having from 2 to 20 carbon atoms. Typically $R^4$ is selected from ethylene, propylene, $—CH_2\ CHCH_3—$, butylene, $—CH_2\ CH(CH_3)CH_2—$, pentamethylene, hexamethylene, 3-ethyl-hexamethylene, octamethylene, and decamethylene. $R^1$ typically is $—CH_2\ CH_2\ CH_2\ NHCH_2\ CH_2\ NH_2$ or $—CH_2\ CH(CH_3)CH_2\ NHCH_2\ CH_2\ NH_2$. Salts of these same aminofunctional groups may also be used. Examples of such salts include alkyl carboxylate salts, aryl carboxylate salts, halide salts such as chlorides and bromides, and other neutralization products of the amines with organic acids. Although the group $R^2$ may be R, $R^1$, or —OH, typically $R^2$ is methyl or —OH. The polyorganosiloxanes may have from 0.1 to 15 molar percent of the above described amino groups and most typically from 0.2 to 10 molar percent of the above described amino groups. In the above formulas, typically a has a value of from 50 to 2000, and b has a value of 1 to 100. The aminofunctional polyorganosiloxanes useful in this invention can be prepared by procedures well known in the art. Many of these polyorganosiloxanes are available commercially.

The amount of the silanol functional organopolysiloxane added in step I may vary. The amount used will depend on the type and amount of boron compound used in step I) and the extent of crosslinking desired. Typically, the amount of the silanol functional organopolysiloxane ranges from 50 to 99, alternatively from 75 to 95, alternatively from 85 to 90 weight, percent based on the total weight of the mixture in step I.

B) The Boron Compound

Component B) is a boron compound. As used herein, a “boron compound” means any compound containing boron. Any boron compound known to react with organopolysiloxanes may be selected as component B). Alternatively, the boron compound may be selected from those known to react with silanol functional groups on organopolysiloxanes. Such boron compounds include; boron or boric oxide, boric acid, borates, boric anhydride. Boric acid may be orthoboric acid, metaboric acid, or tetraboric acid. Borates include alkyl and allyl boric acid esters/triorganoborates that hydrolyse to boric acid in the presence of water, such as triethylborate, triphenylborate, tribenzyl borate, tricyclohexyl borate, tri(methylsilyl) borate, tri-t-butyl borate, trialkoxyboroxines such as trimethoxyboroxine and triisopropoxyboroxine, triethanolamineborate, and derivatives such as 2,2'-oxybis[4,4,6-trimethyl-1,3,2-dioxaboranine. Borates also encompass inorganic borates such as diammonium pentaborate, sodium tetraborate decahydrate (borax), potassium pentaborate, magnesium diborate, calcium monoborate, barium triborate, and zinc metaborate. Suitable boron compounds further includes the partial hydrolysis products of the aforementioned borates. Typically, the boron compound is boron oxide having the formula $B_2O_3$ [CAS registry #1303-86-2], or boric acid having the formula $H_3BO_3$ [CAS registry #10043-35-3].

The boron compound may be added either alone or in combination with other ingredients in step I.

In one embodiment, the boron compound is boron oxide or boric acid, and is dispersed in a trimethylsiloxy terminated polydimethylsiloxane, such as Dow Corning® 200 fluid having a viscosity ranging from 0.65 cS ($mm^2/s$) at 25° C. to 100,000 cS ($mm^2/s$) at 25° C., alternatively from 100 to 10,000 cS ($mm^2/s$) at 25° C., or alternatively from 100 to 1,000 cS ($mm^2/s$) at 25° C.

The amount of boron oxide or boric acid dispersed in the trimethylsiloxy terminated polydimethylsiloxane may vary, but typically ranges from 0.5 to 70, alternatively from 10 to 50 weight percent alternatively from 40 to 50 weight percent.

The amount of boron compound added in step I may vary. The amount used will depend on the type and amount of organopolysiloxane used in step I) and the extent of crosslinking desired. Typically, the amount of boron compound ranges from 0.05 to 30, alternatively from 0.1 to 10 alternatively from 0.1 to 6 weight percent based on the total weight of the mixture in step I.

C) The Emulsifier

Component C in the process of the present disclosure is an emulsifier. As used herein, "emulsifier" refers to any compound or substance that enables the formation of an emulsion. The emulsion may be an oil/water emulsion, a water/oil emulsion, a multiple phase or triple emulsion. The emulsifier may be selected from any surface active compound or polymer capable of stabilizing emulsions. Typically, such surface active compounds or polymers stabilize emulsions by preventing coalescence of the dispersed particles. The surface active compounds useful as emulsifiers in the present process may be a surfactant or combination of surfactants. The surfactant may be an anionic surfactant, cationic surfactant, nonionic surfactant, amphoteric surfactant, or a mixture of any of these surfactants.

Representative examples of suitable anionic surfactants include alkali metal soaps of higher fatty acids, alkylaryl sulphonates such as sodium dodecyl benzene sulphonate, long chain fatty alcohol sulphates, olefin sulphates and olefin sulphonates, sulphated monoglycerides, sulphated esters, sulphonated ethoxylated alcohols, sulphosuccinates, alkane sulphonates, phosphate esters, alkyl isethionates, alkyl taurates, and alkyl sarcosinates.

Representative examples of suitable cationic surfactants include alkylamine salts, quaternary ammonium salts, sulphonium salts, and phosphonium salts. Representative examples of suitable nonionic surfactants include condensates of ethylene oxide with long chain fatty alcohols or fatty acids such as a $C_{12-16}$ alcohol, condensates of ethylene oxide with an amine or an amide, condensation products of ethylene and propylene oxide, esters of glycerol, sucrose, sorbitol, fatty acid alkylol amides, sucrose esters, fluoro-surfactants, and fatty amine oxides. Representative examples of suitable amphoteric surfactants include imidazoline compounds, alkylaminoacid salts, and betaines.

Representative examples of suitable commercially available nonionic surfactants include polyoxyethylene fatty alcohols sold under the tradename BRIJ® by Uniqema (ICI Surfactants), Wilmington, Del. Some examples are BRIJ® 35 Liquid, an ethoxylated alcohol known as polyoxyethylene (23) lauryl ether, and BRIJ®30, another ethoxylated alcohol known as polyoxyethylene (4) lauryl ether. Some additional nonionic surfactants include ethoxylated alcohols sold under the trademark TERGITOL® by The Dow Chemical Company, Midland, Mich. Some example are TERGITOL® TMN-6, an ethoxylated alcohol known as ethoxylated trimethylnonanol; and various of the ethoxylated alcohols, i.e., $C_{12}$-$C_{14}$ secondary alcohol ethoxylates, sold under the trademarks TERGITOL® 15-S-5, TERGITOL® 15-S-12, TERGITOL® 15-S-15, and TERGITOL® 15-S-40. Lutensol® supplied by BASF in the series of Lutensol XP known as ethoxylated, C10-Guerbet alcohol and Lutensol TO known as ethoxylated, iso-C13 alcohol may also be used.

When mixtures containing nonionic surfactants are used, one nonionic surfactant may have a low Hydrophile-Lipophile Balance (HLB) and the other nonionic surfactant may have a high HLB, such that the two nonionic surfactants have a combined HLB of 11-15, alternatively a combined HLB of 12.5-14.5.

Alternatively, the emulsifier may be a polymer or those materials consider as "thickeners" or "thickening agents". Such polymeric emulsifiers include polyvinyl alcohol, cellulosic polymers or xanthan gums. The polyvinyl alcohol includes hydrolyzed polyvinyl alcohols, such as 80-95% hydrolyzed polyvinyl alcohol. Suitable thickening agents are exemplified by sodium alginate, gum arabic, polyoxyethylene, guar gum, hydroxypropyl guar gum, ethoxylated alcohols, such as laureth-4 or polyethylene glycol 400, cellulose derivatives exemplified by carboxy methylcellulose, methylcellulose, methylhydroxypropylcellulose, hydroxypropylcellulose, polypropylhydroxyethylcellulose, starch, and starch derivatives exemplified by hydroxyethylamylose and starch amylose, locust bean gum, electrolytes exemplified by sodium chloride and ammonium chloride, and saccharides such as fructose and glucose, and derivatives of saccharides such as PEG-120 methyl glucose diolate or mixtures of 2 or more of these. Typically the thickening agent is selected from the group consisting of cellulose derivatives, saccharide derivatives, and electrolytes, or from a combination of two or more of the above thickening agents exemplified by a combination of a cellulose derivative and any electrolyte, and a starch derivative and any electrolyte.

The emulsifier may be added either alone or in combination with varying amounts of water in step I. Typically, when a surfactant or surfactant combination is selected as the emulsifier, the surfactant is added in step I as a concentrated aqueous dispersion, or alternatively as an aqueous solution.

In one embodiment, the emulsifier is an aqueous solution containing at least 70 weight percent of two nonionic surfactants having a combined HLB of 8-15.

Alternatively the emulsifier is an aqueous solution of 5 to 30 weight percent of nonionic surfactant having alone a HLB of 8 to 15, or the emulsifier is an aqueous solution containing at least 20 weight percent of one nonionic surfactant and a cationic surfactant, or the emulsifier is an aqueous surfactant containing 30 to 100 weight percent of a anionic surfactant.

The amount of emulsifier added in step I may vary. The amount used will depend on the type of emulsion and the particle size desired. Typically, the amount of emulsifier added in Step I is 0.1 to 40, alternatively the amount is 0.5 to 30 weight percent of the mixture in Step I.

Mixing in step (I) can be accomplished by any method known in the art to affect mixing of high viscosity materials. The mixing may occur either as a batch, semi-continuous, or continuous process. Mixing may occur, for example using, batch mixing equipments with medium/low shear include change-can mixers, double-planetary mixers, conical-screw mixers, ribbon blenders, double-arm or sigma-blade mixers; batch equipments with high-shear and high-speed dispersers include those made by Charles Ross & Sons (NY), Hockmeyer Equipment Corp. (NJ); batch equipments with high shear actions include Banbury-type (CW Brabender Instruments Inc., NJ) and Henschel type (Henschel mixers America, TX). Illustrative examples of continuous mixers/ compounders include extruders single-screw, twin-screw, and multi-screw extruders, co-rotating extruders, such as those manufactured by Krupp Werner & Pfleiderer Corp (Ramsey, N.J.), and Leistritz (NJ); twin-screw counter-rotating extruders, two-stage extruders, twin-rotor continuous mixers, dynamic or static mixers or combinations of these equipments.

The temperature and pressure at which the mixing of step I occurs is not critical, but generally is conducted at ambient temperature and pressures. Typically, the temperature of the mixture will increase during the mixing process due to the mechanical energy associated with shearing such high viscosity materials.

Although not wishing to be bound by any theory, the present inventors believe that as a result of mixing components A), B), and C) the boron compound reacts with the silanol functional organopolysiloxane to form various crosslinks. However, the inclusion of an emulsifier in the step I) mixture enhances subsequent emulsion formation in step II).

Step II of the process involves admixing water to the mixture of step Ito form an emulsion. Typically 5 to 700 parts water are mixed for every 100 parts of the step I mixture to form an emulsion. In one embodiment the emulsion formed is a water continuous emulsion. Typically, the water continuous emulsion has dispersed particles of the boron crosslinked organopolysiloxane from step I, and having an average particle size less than 150 μm.

The amount of water added can vary from 5 to 700 parts per 100 parts by weight of the mixture from step I. The water is added to the mixture from step I at such a rate so as to form an emulsion of the mixture of step I. While this amount of water can vary depending on the selection of the boron oxide crosslinked organopolysiloxane and emulsifier, generally the amount of water is from 5 to 700 parts per 100 parts by weight of the step I mixture, alternatively from 5 to 100 parts per 100 parts by weight of the step I mixture, or alternatively from 5 to 70 parts per 100 parts by weight of the step I mixture.

Typically the water is added to the mixture from step I in incremental portions, whereby each incremental portion comprises less than 30 weight % of the mixture from step I and each incremental portion of water is added successively to the previous after the dispersion of the previous incremental portion of water, wherein sufficient incremental portions of water are added to form an emulsion of the boron oxide crosslinked organopolysiloxane.

Mixing in step (II) can be accomplished by any method known in the art to affect mixing of high viscosity materials. The mixing may occur either as a batch, semi-continuous, or continuous process. Any of the mixing methods as described for step (I), may be used to affect mixing in step (II).

Optionally, the water continuous emulsion formed in step (II) may be further sheared according to step (III) to reduce particle size and/or improve long term storage stability. The shearing may occur by any of the mixing techniques discussed above.

The emulsion products resulting from the present process may be an oil/water emulsion, a water/oil emulsion, a multiple phase or triple emulsion.

In one embodiment, the emulsion products produced by the present process are oil/water emulsions. The oil/water emulsion may be characterized by average volume particle of the dispersed boron crosslinked organopolysiloxane phase in a continuous aqueous phase. The particle size may be determined by laser diffraction of the emulsion. Suitable laser diffraction techniques are well known in the art. The particle size is obtained from a particle size distribution (PSD). The PSD can be determined on a volume, surface, length basis. The volume particle size is equal to the diameter of the sphere that has the same volume as a given particle. The term Dv represents the average volume particle size of the dispersed particles. Dv 0.5 is the particle size measured in volume corresponding to 50% of the cumulative particle population. In other words if Dv 0.5=10 μm, 50% of the particle have an average volume particle size below 10 μm and 50% of the particle have a volume average particle size above 10 μm. Unless indicated otherwise all average volume particle sizes are calculated using Dv 0.5.

The average volume particle size of the dispersed siloxane particles in the oil/water emulsions is between 0.1 μm and 150 μm;

or between 0.1 μm and 30 μm;

or between 0.3 μm and 5.0 μm.

The emulsions of the present disclosure may be further characterized by the properties of the resulting films or coatings produced after allowing a film of the emulsion to dry. Typically, such coatings are obtained by forming a film of the emulsion, and allowing the film to stand for a sufficient period of time to evaporate the water present in the emulsion. This process may be accelerated by increasing the ambient temperature of the film or coating.

The films or coatings resulting from the present emulsions may by characterized by their rheological properties, such as with a Carri-Med rheometer to determine in the LVR at 0.2 Hz both the dynamic shear storage (G') and loss module (G"). When a solid silicone coating is produced upon drying a film of the boron crosslinked organopolysiloxane emulsion, typically G' ranges from 200 Pa to 10,000,000 Pa alternatively, G' ranges from 1000 Pa to 200,000 Pa;

G" ranges from 1000 Pa to 10,000,000 Pa alternatively, G" ranges from 1000 Pa to 200,000 Pa for the resulting silicone coating at 25° C.

In one embodiment, the resulting films may be considered as high viscosity fluids as characterized by viscosity. Such viscosity measurements may be conducted using a rheometer. The dynamic viscosity of the resulting films may vary from 100 Pa to 10 000 000 Pa, or alternatively, from 1000 Pa to 300,000 Pa, as measured at 25° C.

Other additives can also be incorporated in the emulsions of the present disclosure, such as fillers, foam control agents; anti-freeze agents and biocides.

In one embodiment, silica is added to the emulsion to affect subsequent properties, and in particular dilatant properties. The amount and type of silica added to the emulsion may vary. Typically, the amount of silica added to the emulsion may vary from 0.1 to 50 weight percent, alternatively, 1 to 40 weight percent, or alternatively 5 to 30 weight percent may be added to the emulsion. The silica may be added at any time during the processing of the emulsion, but typically is post added. That is, the emulsion is first prepared, and then the colloidal silica is added to the prepared emulsion.

Suitable silicas include fumed silicas such as AEROSIL® OX-50 (40 nanometer average particle diameter silica available from Evonik); stabilized silica sols such as the KLEBOSOL® Series available from Rohm and Haas), KLEBOSOL® 30H25 (25 nm average particle diameter proton stabilized waterborne colloidal silica sol having a ph of 2.2 and a 30% solids content, KLEBOSOL 30H50 (50 nm average particle diameter proton stabilized waterborne colloidal silica sol having a pH of 2.5 to 3.0 and a 30% solids content, KLEBOSOL 30N12 (12 nm average particle diameter ammonium ion stabilized waterborne colloidal silica sol having a pH of 9.5 to 10.5 and a 30% solids content, KLEBOSOL 30N25 (25 nm average particle diameter ammonium ion stabilized waterborne colloidal silica sol having a pH of 9.6 and a 30% solids content, NALCO® 1034A (20 nanometer average particle diameter acidic colloidal silica sol having a pH of 2.8 and a 34% solids content, available from Nalco Chemical Co.), NALCO 1130 (8 nanometer average particle diameter alkaline colloidal silica sol having a pH of 10.0 and a 30% solids content, available from Nalco Chemical Co.) and NALCO 1140 (15 nanometer average particle diameter alkaline colloidal silica sol having a pH of 9.4 and a 40% solids content, available from Nalco Chemical Co.). Suitable colloidal silicas include the LUDOX® series from W.R. Grace such as; LUDOX AM, LUDOX AM-30 (12 nm average particle diameter aqueous silica sol having a 30% solids content), LUDOX AS, LUDOX HS40, LUDOX LS, LUDOX TM and LUDOX TMA (22 nm average particle diameter aqueous silica sol having a 34% solids:content). Another suitable silica includes those marketed as SNOWTEX® colloidal silicas from Nissan Chemical (Houston, Tex.), such as SNOWTEX.

EXAMPLES

These examples are intended to illustrate the invention to one of ordinary skill in the art and should not be interpreted as limiting the scope of the invention set forth in the claims. All measurements and experiments were conducted at 23° C., unless indicated otherwise.

Mean particle size was determined using a Malvern Mastersizer 2000. Rheological properties were determined using a TA Instruments ARES rheometer equipped with cone-and-plate geometry (Example 1 to 5) and a Carri-Med Rheometer $CSL^2$ with a cone-and-plate geometry (Example 6 to 10).

Example 1

First, 50 g of a $Me_2SiOH$ terminated dimethylpolysiloxane having a viscosity of approximately 50,000 mPa sec. (cP) and a number average molecular weight of approximately 61,000 was weighed into a max 100 cup followed by 0.10 g of a 50% by weight dispersion of boric oxide in trimethylsiloxy-capped polydimethylsiloxane fluid having an approximate kinematic viscosity of 1000 cSt. The cup was closed and placed into a Speedmixer® DAC 150 mixer and the cup was spun for 20 seconds at maximum speed. The cup was allowed to remain undisturbed for 15 minutes after which it was spun again for 20 seconds at maximum speed. After an additional 10 minutes at rest, the cup was spun again for 20 seconds. Immediately following the previous spinning, 0.75 g of lauryl alcohol (4) ethoxylate (Brij® 30) was added followed by 1.5 g of a 72% aqueous solution of lauryl alcohol (23) ethoxylate (Brij® 35L) and 0.60 g of deionized (DI) water. The cup was closed and spun in the Speedmixer® for 20 seconds. The contents of the cup had formed a mass having a thick gel-like consistence and the walls of the cup were scraped with a spatula. The cup and its contents were spun again for 20 seconds. The thick phase composition was diluted incrementally with a total of 31 g of DI water. The first increment was 5 g followed by another 5 g then 10 g followed with a final 11 g. The cup was spun for 18 seconds at full speed in the SpeedMixer® after each incremental addition of water. The resulting final composition was a milky-white liquid of low viscosity and consisted of an oil/water emulsion of approximately 60% by weight polydimethylsiloxane containing boron oxide and having a mean particle size of approximately 0.75 μm. The following day, a 20 g portion of the emulsion was poured into a Petri dish and allowed to evaporate and at ambient conditions for 24 hours. The resulting polymer from the emulsion was inspected and found to have increased in viscosity substantially from that of the starting silicone polymer. Viscosity of the polymer from the emulsion was determined using a rheometer and found to have a zero-shear-rate viscosity of approximately $10^7$ cP (@$10^{-1}$ $sec.^{-1}$& 24° C.), as summarized in FIG. 1. These results show the viscosity of the siloxane polymer from the emulsion was significantly higher than the viscosity of the starting siloxane polymer (approximately $5\times10^4$ cP).

Example 2

Using the same procedure as described in Example 1, a composition prepared from 50 g of a $Me_2SiOH$ terminated dimethylpolysiloxane having a viscosity of approximately 50,000 mPa sec. (cP) and a number average molecular weight of approximately 61,000, 0.11 g of a 50% by weight dispersion of boric oxide in trimethylsiloxy-capped polydimethylsiloxane fluid having an approximate kinematic viscosity of 1000 cSt was emulsified using 0.75 g of lauryl alcohol (4) ethoxylate (Brij® 30, 1.5 g of a 72% aqueous solution of lauryl alcohol (23) ethoxylate (Brij® 35 L) and 0.60 g of deionized (DI) water. The emulsion thick phase was diluted incrementally with a total of 31 g of DI water using the same procedure of example 1. Mean particle size of the emulsion was approximately 0.75 μm.

Example 3

Using the same procedure and quantities as described in Example 2 except for the amount of boron oxide dispersion in polydimethylsiloxane used, an emulsion was prepared. This emulsion was prepared using 50 g of a $Me_2SiOH$ terminated dimethylpolysiloxane and 0.40 g of boron oxide/polydimethylsiloxane dispersion. Mean particle size of the emulsion was approximately 0.75 μm.

Example 4

Using the procedure as described in Example 1, a composition prepared from 50 g SiOH functional polydimethylsiloxane having a viscosity of approximately 50,000 mPa sec. (cP) and a number average molecular weight of approximately 61,000, 0.50 g of a 50% by weight dispersion of boric oxide in trimethylsiloxy-capped polydimethylsiloxane fluid having an approximate kinematic viscosity of 1000 cSt was emulsified using 1.25 g of 60% by weight aqueous sodium secondary alkyl sodium sulfonate (Hostapur® SAS-60) and 5.0 g of water. The resulting thick phase composition was diluted with 27 g of DI water incrementally as described in Example 1. The resulting emulsion consisted of an approximately 60% solids anionic emulsion of PDMS containing 0.5% $B_2O_3$. Removal of water from this emulsion resulted in a high viscosity polymer.

Example 5

Using the procedure as described in Example 1, a composition prepared from 50 g SiOH functional polydimethylsiloxane having a viscosity of approximately 50,000 mPa sec. (cP) and a number average molecular weight of approximately 61,000, 0.50 g of a 50% by weight dispersion of boric oxide in trimethylsiloxy-capped polydimethylsiloxane fluid having an approximate kinematic viscosity of 1000 cSt was emulsified using 3.3 g of a 30% aqueous solution of cetyltrimethylammonium chloride (CETAC® 30) and 0g of water.

The resulting thick phase was diluted with 30 g of DI water incrementally as described in Example 1. The resulting emulsion consisted of an approximately 60% cationic emulsion of PDMS containing 500 ppm $B_2O_3$. Removal of water from this emulsion resulted in a film of polymer that had a rubbery consistency.

Example 6

First, 2 g of α-iso-tridecyl ω-hydroxyl poly(oxythylene) (Lutensol TO12) was added to a 250 mL glass beaker followed by 40 g of deionized water. This surfactant solution was stirred for one hour (150 rpm with a 4-blades metal stirrer on an IKA rotor). 50 g of a SiOH functional siloxane having a viscosity of approximately 50 mPa sec. (cP) and a number average molecular weight of 800 was weighed into a max 100 cup followed by 6.6 g of a 50% by weight dispersion of boric oxide in trimethylsiloxy-capped polydimethylsiloxane fluid having an approximate kinematic viscosity of 1000 cS ($mm^2/s$) at 25° C. The cup was closed and placed into a Speedmixer® DAC 150 mixer and the cup was spun for 20 seconds at maximum speed. The contents of the cup were then added in the surfactant solution as described above, and mixed with an Ultraturrax mixer at maximum speed. Then, 0.17 g of stearic acid and 0.18 g of oleic acid were added under gentle stirring (150 rpm with a 4-blades metal stirrer on an IKA rotor). The resulting final composition was a milky-white liquid of low viscosity and consisted of an oil/water emulsion of approximately 60% by weight polydimethylsiloxane containing boron oxide and having a mean particle size of approximately 3.8 μm. The following day, a 20 g portion of the emulsion was poured into an aluminum cup and allowed to evaporate and at ambient conditions for 24 hours. The resulting polymer from the emulsion was inspected and found to have formed a film. The rheological properties of this film were studied using a Carri-med rheometer. The linear-viscoelastic region (LVR) was first determined (torque ramp with a 2 cm 4° steel cone geometry @ 0.2 Hz and 25° C.). Then both the storage (G') and loss module (0") were determined in this region, G' was 13600 Pa and G" was 72400 Pa.

Example 7

First, 40 g of secondary alkyl sulfonate (hostapur SAS30) at 30% active was weighted in a 500 mL glass beaker followed by 100 g of deionized water. (150 rpm with a 4-blades metal stirrer on an IKA rotor). 300 g of a SiOH functional siloxane having a viscosity of approximately 50 mPa sec. (cP) and a number average molecular weight of approximately 800 was weighed into 500 mL glass beaker followed by 37 g of a 50% by weight dispersion of boric oxide in trimethylsiloxy-capped polydimethylsiloxane fluid having a kinematic viscosity of 1000 cS ($mm^2/s$) at 25° C. The mixture was stirred 15 min (150 rpm with a 4-blades metal stirrer on an IKA rotor). This silicone phase was then poured in the surfactant aqueous solution as described above, and stirred for 5 min. The resulting mixture was then processed by one pass at 400 bar in the Rannie® APV system 200. Then, 0.55 g of stearic acid and 0.0.78 g of oleic acid were finally added under gentle stirring (150 rpm with a 4-blades metal stirrer on an IKA rotor). The resulting final composition was a milky-white liquid of low viscosity and consisted of an oil/water emulsion of approximately 60% by weight polydimethylsiloxane containing boron oxide and having a mean particle size of approximately 1.3 um. As described previously, the rheology of the film was studied. The modulus G' was 2400 Pa and G" was 28600 Pa.

Example 8

Using the same procedure and quantities as described in Example 6 except that 1.5 g of the α-iso-tridecyl ω-hydroxyl poly(oxythylene) was replaced by the hexadecyltrimethylammonium chloride at 30% active (Arquad16-29). As described previously, the rheology of the film was studied. The modulus G' was 29970 Pa and G" was 112500 Pa.

Example 9

Using the same procedure and quantities as described in Example 6 except that 4.2 g of the SiOH functional siloxane was replaced by Dow Corning ® AP-6087, which is a dimethyl-, methyl-, aminoethylaminoisobutyl, siloxane, having terminal methoxy and hydroxyl functional siloxy groups. The rheology of the film was studied as described previously. The modulus G' was 3300 Pa and G" was 29400 Pa.

Example 10

Using the same procedure and quantities as described in Example 6 except that 0.6 g of the SiOH functional siloxane was replaced by the ethylenediaminepropyl trimethoxysilane. As described previously, the rheology of the film was studied. The modulus G' was 23300 Pa and G" was 62000 Pa.

The invention claimed is:

1. A process for preparing an emulsion composition comprising:

I) forming a mixture of;
 50-99 weight percent A) a silanol functional organopolysiloxane,
 0.05-30 weight percent B) a boron compound,
 0.10-40 weight percent C) an emulsifier,
 with the proviso the sum of A), B), and C) is 100 weight percent,
II) admixing water to the mixture from step I) to form a water continuous emulsion having a dispersed phase comprising a boron crosslinked organopolysiloxane, wherein 5 to 700 parts water are admixed for every 100 parts of the step I mixture,
III) optionally, further shear mixing the emulsion.

2. The process according to claim 1 wherein the organopolysiloxane is a silanol terminated polydimethylsiloxane.

3. The process according to claim 1 wherein the boron compound is $B_2O_3$ or $H_3BO_3$.

4. The process according to claim 1 wherein the emulsifier is a mixture of nonionic surfactants.

5. The process according to claim 4 wherein the nonionic surfactants are polyoxyethylene fatty alcohols.

6. The process according to claim 4 wherein the nonionic surfactants have a combined HLB value of 8-15.

7. The process according to claim 4 wherein the nonionic surfactant mixture comprises polyoxyethylene (23) lauryl ether and polyoxyethylene (4) lauryl ether.

8. The process according to claim 4 wherein the nonionic surfactant mixture comprises an ethoxylated C10-Fuerbet alcohol or an ethoxylated iso-C13 alcohol.

9. The process according to claim 1 wherein the water is added in incremental portion such that each portion is less than 30 weight % of the mixture from step I.

* * * * *